(12) United States Patent
Malek et al.

(10) Patent No.: US 9,822,313 B2
(45) Date of Patent: Nov. 21, 2017

(54) FORMING LIGHT HYDROCARBONS

(71) Applicant: Dow Global Technologies LLC, Midland, MA (US)

(72) Inventors: Andrzej Malek, Midland, MI (US); Thomas Davidian, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/511,047

(22) PCT Filed: Sep. 21, 2015

(86) PCT No.: PCT/US2015/051234
§ 371 (c)(1),
(2) Date: Mar. 14, 2017

(87) PCT Pub. No.: WO2016/048900
PCT Pub. Date: Mar. 31, 2016

(65) Prior Publication Data
US 2017/0283708 A1  Oct. 5, 2017

Related U.S. Application Data

(60) Provisional application No. 62/053,922, filed on Sep. 23, 2014.

(51) Int. Cl.
| | | |
|---|---|---|
| *C10G 2/00* | (2006.01) | |
| *B01J 29/24* | (2006.01) | |
| *B01J 29/46* | (2006.01) | |
| *B01J 29/72* | (2006.01) | |

(52) U.S. Cl.
CPC .............. *C10G 2/332* (2013.01); *B01J 29/24* (2013.01); *B01J 29/46* (2013.01); *C10G 2/333* (2013.01); *C10G 2/334* (2013.01)

(58) Field of Classification Search
CPC ... C10G 2/00; C10G 2/30; C10G 2/32; C10G 2/331; C10G 2400/02; C10G 2300/70; C10G 2/334; B01J 29/072; B01J 29/405; B01J 29/146; B01J 29/7815; B01J 29/185
See application file for complete search history.

(56) References Cited

U.S. PATENT DOCUMENTS

| | | |
|---|---|---|
| 2011/0124751 A1 | 5/2011 | Fjare et al. |
| 2014/0018232 A1 | 1/2014 | Wang et al. |

OTHER PUBLICATIONS

International Search Report & Written Opinion for related PCT Application PCT/US2015/051234, dated Nov. 25, 2015 (12 pgs).
2nd Written Opinion for related PCT Application PCT/US2015/051234, dated Aug. 19, 2016 (5 pgs).
International Preliminary Report on Patentability for related PCT Application PCT/US2015/051234, dated Nov. 11, 2016 (12 pgs).
Tsakoumis, et al., "Deactivation of Cobalt Based Fischer-Tropsch Catalysts: A Review"; Catalysis Today, vol. 154, No. 3-4 (22 pgs) (Sep. 15, 2010).
Madikizela-Mnqanqeni, et al., "The Effect of Sulfur Addition During the Preparartion of Co/Zn/TiO2 Fischer-Tropsch Catalysts"; Applied Catalysis A: General, vol. 340, No. 1, (10 pgs) (May 15, 2008).

*Primary Examiner* — Jafar Parsa
(74) *Attorney, Agent, or Firm* — Brooks, Cameron & Huebsch, PLLC

(57) ABSTRACT

Form liquid product stream that has a $C_{13}$ to $C_{20}$ hydrocarbon content of less than 5.0 wt % based upon a total weight of the liquid product stream via a process that includes contacting synthesis gas with a sulfurized Zeolite Socony Mobil-5 catalyst. The sulfurized Zeolite Socony Mobil-5 catalyst can include ZSM-5, cobalt, an alkali metal, sulfur, and a reduction promoter.

8 Claims, No Drawings

FORMING LIGHT HYDROCARBONS

This application is a National Stage Application under 35 U.S.C. §371 of International Application Number PCT/US2015/051234, filed Sep. 21, 2015 and published as WO 2016/048900 on Mar. 31, 2016, which claims the benefit to U.S. Provisional Application 62/053,922, filed Sep. 23, 2014, the entire contents of which are incorporated herein by reference in its entirety.

This disclosure relates to processes for forming light hydrocarbons, and in particular forming hydrocarbons having five to twelve carbon atoms.

Some previous processes have utilized zeolites with cobalt or ruthenium to produce light hydrocarbons. However, the hydrocarbon products of these previous processes have a broad product distribution and include undesirable amounts of long chain hydrocarbons, such as hydrocarbons having thirteen to twenty carbon atoms or greater and/or solid waxes. Some previous processes have utilized zeolites treated to produce mesopores. However, mesopores can be undesirable for some applications.

As used herein, light hydrocarbons refer to hydrocarbons having five to twelve carbon atoms ($C_5$-$C_{12}$ hydrocarbons). $C_5$-$C_{12}$ hydrocarbons can be used for a variety of applications, such as feedstock for steam cracking applications to produce ethylene and/or propylene or as fuel, for example.

This disclosure provides processes for forming $C_5$-$C_{12}$ hydrocarbons, and/or subsets thereof, including contacting synthesis gas with a sulfurized Zeolite Socony Mobil-5 (ZSM-5) catalyst. For instance, a feed stream including synthesis gas can contact the sulfurized ZSM-5 catalyst. Advantageously, the process provides desirable $C_5$-$C_{12}$ hydrocarbons, while reducing an amount of long chain hydrocarbon product and/or solid waxes, as compared to other processes. Surprisingly, the processes disclosed herein can provide desirable $C_5$-$C_{12}$ hydrocarbons by utilizing the sulfurized ZSM-5 catalyst, even though sulfur is often considered to poison Fischer-Tropsch catalysts.

Synthesis gas, which may be referred to as syn gas, includes carbon monoxide (CO) and hydrogen ($H_2$). The syn gas can be from 15 mole percent CO to 50 mole percent CO and 50 mole percent $H_2$ to 85 mole percent $H_2$. Some embodiments of the present disclosure provide that an inert gas, such as helium, nitrogen, or carbon dioxide, among others, may be utilized with the syn gas, e.g, as a component of the feed stream. Various amounts of the inert gas can be utilized for differing applications.

The sulfurized ZSM-5 catalyst can include Zeolite Socony Mobil-5, e.g. a ZSM-5 support, cobalt, an alkali metal, sulfur, and a reduction promoter. The ZSM-5 support can include a binder material, such as silica, alumina, clay, or combinations thereof, among others.

ZSM-5 is an aluminosilicate zeolite. ZSM-5 can be represented by the chemical formula $Na_nAl_nSi_{96-n}O_{192} \cdot 16H_2O$, where $0<n<27$.

The sulfurized ZSM-5 catalyst includes cobalt. The cobalt can be present in an amount within a range of from 1 to 25 weight percent (wt %) based upon a dry weight of the sulfurized ZSM-5 catalyst. Throughout this disclosure, all individual values and subranges from a lower limit associated with a range to an upper limit associated with the range are included herein and disclosed herein; for instance, as mentioned cobalt can be present in an amount within a range of from 1 to 25 weight percent, therefore cobalt can be present in an amount within a range of from 2 to 25 weight percent, 3 to 25 weight percent, 5 to 25 weight percent, 1 to 23 weight percent, 1 to 20 weight percent, or 1 to 15 weight percent, for example. The dry weight of the sulfurized ZSM-5 catalyst is determined as combined weight of the components of the sulfurized ZSM-5 catalyst after calcination, excluding any adsorbed water. Some embodiments of the present disclosure provide the cobalt is present in an amount within a range of from 5 to 20 wt % based upon a dry weight of the sulfurized ZSM-5 catalyst.

The sulfurized ZSM-5 catalyst can include an alkali metal. An example of the alkali metal is sodium, among others. The alkali metal can be present in an amount within a range of from 0.01 to 4.50 wt % based upon a dry weight of the sulfurized ZSM-5 catalyst. Some embodiments of the present disclosure provide the alkali metal can be present in an amount within a range of from 0.1 to 3.5 wt % based upon the dry weight of the sulfurized ZSM-5 catalyst.

As used herein, sulfurized refers to including sulfur. The sulfurized ZSM-5 catalyst includes sulfur, e.g. the ZSM-5 support can be doped with sulfur. For instance, the sulfur can be incorporated into the sulfurized ZSM-5 catalyst via sulfate ions ($SO_4^{2-}$), among others. The sulfur can be present in an amount within a range of from 0.01 to 1.00 wt % based upon a dry weight of the sulfurized ZSM-5 catalyst. Some embodiments of the present disclosure provide the sulfur can be present in an amount within a range of from 0.01 to 0.50 wt %, 0.05 to 0.30 or based upon the dry weight of the sulfurized ZSM-5 catalyst.

The sulfurized ZSM-5 catalyst can include a reduction promoter. Examples of the reduction promoter are ruthenium, platinum, and palladium, among others. When utilized, the reduction promoter can be present in an amount within a range of from 0.01 to 5.00 wt % based upon a dry weight of sulfurized ZSM-5 catalyst. Some embodiments of the present disclosure provide that the reduction promoter can be present in an amount within a range of from 0.05 to 2.5 wt %, or 0.07 to 0.50 wt % based upon the dry weight of the sulfurized ZSM-5 catalyst.

The ZSM-5 support can be obtained from commercial suppliers or synthesized. Sodium and/or sulfate concentrations of the ZSM-5 support can be adjusted by techniques known to those skilled in the art. For instance, an ion exchange of sodium with a solution containing ammonium nitrate can decrease the sodium concentration. Additionally, sulfate concentration can be reduced by washing, e.g., repeated washings, with deionized water. Further, techniques for increasing the sodium concentration and/or sulfate concentration include, but are not limited to, incipient wetness impregnation of sodium and or sulfate containing precursors, wet impregnation, mechanical mixing, and chemical vapor deposition. The sodium and sulfate precursors may be added sequentially or simultaneously. Intermediate drying and/or calcination steps may be utilized.

The sulfurized ZSM-5 catalyst can be prepared by techniques known to those skilled in the art. Examples of such techniques involve impregnation, such as utilizing an aqueous or an organic solution containing a cobalt precursor followed by drying and calcination. Repeated impregnation steps may be utilized to obtain a cobalt concentration as discussed herein. Repeated impregnation steps may be separated by a drying step or a drying step followed by a calcination step, for instance. Examples of cobalt precursors include cobalt nitrate, cobalt sulfate, cobalt acetate, and cobalt acetylacetonate, among others and mixtures thereof. Some embodiments of the present disclosure provide that reduction promoter precursors can be dissolved in a solvent, such as water, methanol, ethanol, acetone, among others, or dissolved in the solution containing the cobalt precursor and then impregnated onto the ZSM-5 support, followed by drying and calcination steps. Reduction promoter precursors may include salts with counter anions of nitrate, acetate, chloride, nitrosyl, or mixtures thereof, among others.

The sulfurized ZSM-5 catalyst can be activated. Embodiments of the present disclosure provide that conditions for activating the sulfurized ZSM-5 catalyst include contacting the sulfurized ZSM-5 catalyst with a reducing agent. An example of the reducing agent is hydrogen, among others. Embodiments of the present disclosure provide that conditions for contacting the sulfurized ZSM-5 catalyst with the reducing agent include a gas hourly space velocity (GHSV) within a range of 5 to 100000 $h^{-1}$. Some embodiments of the present disclosure provide that the GHSV is within a range of 25 to 2500 $h^{-1}$. GHSV is a quotient of a volumetric flow rate of reactants, e.g., the reducing agent, and a catalyst bed volume, e.g., the sulfurized ZSM-5 catalyst.

Conditions for activating the sulfurized ZSM-5 catalyst include a temperature, e.g., a reducing temperature, within a range of from 125 to 325° C. Some embodiments of the present disclosure provide that the reducing temperature is within a range of from 150 to 300° C. When sulfate is utilized, a reducing temperature of 350° C. or greater can be detrimental to the catalyst activity.

The sulfurized ZSM-5 catalyst can be activated, e.g., contacted with the reducing agent at the reducing temperature, for a time interval within a range of 0.1 to 48 hours. Some embodiments of the present disclosure provide that the time interval within a range of 1 to 15 hours.

As mentioned, this disclosure provides a process for forming $C_5$-$C_{12}$ hydrocarbons that includes contacting a synthesis gas feed stream with a sulfurized ZSM-5 catalyst. Embodiments of the present disclosure provide that conditions for contacting the synthesis gas feed stream with the sulfurized ZSM-5 catalyst include a GHSV within a range of 100 to 100000 $h^{-1}$. Some embodiments of the present disclosure provide that the GHSV is within a range of 300 to 5000 $h^{-1}$.

Conditions for contacting the synthesis gas feed stream with sulfurized ZSM-5 catalyst include a temperature, e.g., a reaction temperature, within a range of from 150 to 300° C. Some embodiments of the present disclosure provide that the reaction temperature is within a range of from 200 to 275° C.

Conditions for contacting the synthesis gas feed stream with the sulfurized ZSM-5 catalyst include a pressure, e.g., a reaction pressure, within a range of from 2 to 100 bar. Some embodiments of the present disclosure provide that the reaction pressure is within a range of from 5 to 40 bar.

Embodiments of the present disclosure provide that a liquid product stream, e.g. a hydrocarbon product stream, has a $C_5$-$C_{12}$ hydrocarbon content of at least 25 wt % based upon a total weight of the liquid product stream. For example, the product stream of the present disclosure can have a $C_5$-$C_{12}$ hydrocarbon content in a range having a lower value of 25 wt %, 28 wt %, or 30 wt % to an upper value of 75 wt %, 70 wt %, or 65 wt %. Some embodiments of the present disclosure provide that the liquid product stream has a $C_5$-$C_{12}$ hydrocarbon content within a range of from 30 to 60 wt % based upon a total weight of the liquid product stream.

Embodiments of the present disclosure provide that a liquid product stream has a $C_{13}$-$C_{20}$ hydrocarbon content of less than 5.0 wt % based upon a total weight of the liquid product stream. For example, the product stream of the present disclosure can have a $C_{13}$-$C_{20}$ hydrocarbon content of less 5.0 wt %, less than 4.0 wt %, or less than 3.0 wt % based upon a total weight of the liquid product stream. Some embodiments of the present disclosure provide that the liquid product stream has a $C_{13}$-$C_{20}$ hydrocarbon content within a range of from 0.1 to 5.0 wt %, 0.2 to 4.0 wt %, or 0.3 to 3.0 wt % based upon a total weight of the liquid product stream.

EXAMPLES

Materials include: mordenite (HSZ-690 HOA, available from Tosoh Corporation); ZSM-5 (CBV8014, aluminosilicate zeolite, available from Zeolyst International); cobalt nitrate hexahydrate (cobalt precursor, ACS reagent >98%, available from Sigma Aldrich); ruthenium nitrosyl nitrate solution diluted in nitric acid (reduction promoter precursor, available from Sigma Aldrich); sodium sulfate (ACS reagent >99%, anhydrous, available from Sigma Aldrich); ammonium sulfate (available from Sigma Aldrich); and sodium nitrate (available from Sigma Aldrich).

Form sulfurized ZSM-5 catalyst-1 as indicated. Press ZSM-5 into a one-inch diameter die to form a pellet, crush the pellet to form a powder, and sieve the powder. Collect a 20-40 mesh fraction to obtain a ZSM-5 support. Calcine the ZSM-5 support in air at 500° C. for four hours to obtain a calcined ZSM-5 support (4 grams (g)). Prepare an ammonium sulfate solution (ammonium sulfate (0.0378 g) dissolved in de-ionized water (1.4 mL).) Impregnate the ammonium sulfate solution onto the ZSM-5 support to provide 0.2 wt % sulfur; calcine in air for four hours at 500° C. to provide a sulfurized ZSM-5 support. Prepare a cobalt precursor solution (20 milliliter (mL)) having a cobalt concentration of 2 moles/liter (mol/L) by dissolving cobalt nitrate hexahydrate (11.6 g) in deionized water; prepare the precursor solution by mixing in a vial 4.7 mL of the cobalt precursor solution of the ruthenium nitrosyl nitrate solution (0.59 mL) and de-ionized water (2.2 mL). Impregnate the precursor solution (2 mL) onto the sulfurized ZSM-5 support; dry for two hours at 100° C. Repeat the impregnation and drying steps two additional times; then calcine in air for two hours at 300° C. to obtain the sulfurized ZSM-5 catalyst-1.

Form sulfurized ZSM-5 catalyst-2 as sulfurized ZSM-5 catalyst-1, with that changes that prior to the impregnation with the precursor solution, impregnate sodium nitrate solution (0.044 g dissolved in 1.4 ml de-ionized water) to provide 0.3 wt % sodium and calcine in air for four hours at 500° C.

Form sulfurized ZSM-5 catalyst-3 as sulfurized ZSM-5 catalyst-1, with that changes that prior to the impregnation with the precursor solution, impregnate sodium sulfate solution (0.0824 g dissolved in 1.4 mL of de-ionized water) to provide 0.3 wt % sodium and calcine in air for four hours at 500° C.

Form mordenite catalyst-A as ZSM-5 catalyst-1, with that changes that HSZ-690 HOA is utilized rather than ZSM-5; prior to the impregnation with the precursor solution, impregnate sodium sulfate solution (0.0824 g of $Na_2SO_4$ dissolved in 1.4 mL de-ionized water) to provide 0.3 wt % sodium and 0.21 wt % sulfur and calcine in air for four hours at 500° C.

Form ZSM-5 catalyst-B as ZSM-5 catalyst-1, with that changes that prior to the impregnation with the precursor solution, impregnate sodium nitrate solution (0.044 g dissolved in 1.4 mL of de-ionized water) to provide 0.3 wt % sodium; calcine in air for four hours at 500° C.

Determine composition of the catalysts by X-ray fluorescence analysis; weight percents are shown in Table 1.

TABLE 1

| Catalyst | Co (wt %) | Ru (wt %) | Na (wt %) | S (wt %) |
|---|---|---|---|---|
| Sulfurized ZSM-5 catalyst-1 | 13.80 | 0.20 | 0.00 | 0.20 |
| Sulfurized ZSM-5 catalyst-2 | 13.80 | 0.20 | 0.30 | 0.25 |
| Sulfurized ZSM-5 catalyst-3 | 13.00 | 0.20 | 0.27 | 0.16 |
| Mordenite catalyst-A | 12.80 | 0.20 | 0.30 | 0.20 |
| ZSM-5 catalyst B | 13.70 | 0.20 | 0.37 | 0.00 |

Example (Ex) 1

Mix sulfurized ZSM-5 catalyst-1 (1 gram (g)) with silicon carbide (3 milliliters (mL)); load the mixture into a tubular reactor. Purge the reactor system with nitrogen (50 milliliters per minute (mL/min)) and heat the reactor to 150° C. at a rate 5° C./min. Stop nitrogen flow and introduce hydrogen (50 mL/min) at 150° C. and one bar for one hour. Maintain hydrogen flow and increase temperature to by 1° C./minute to 250° C. and maintain for 10 hours. Reduce temperature to 180° C. Stop hydrogen flow and add a flow including carbon monoxide (30 mole percent), hydrogen (60 mole percent), and helium (10 mole percent) to provide a gas hourly space velocity of 1500 h$^1$. Pressurize to 10 bar and increase temperature to desired reaction temperature (220° C.). Stabilize the reactor system for 24 hours then adjust flows to achieve a different gas hourly space velocity (1000 h$^{-1}$) for a desired time on stream and produce liquid product stream. Send reactor effluent to a knock out vessel heated to 170° C., add nitrogen (100 mL/min) to flow exiting the knock out vessel. Analyze with an Agilent 7890A Gas Chromatography system equipped with a 2D analysis system to analyze and quantify $C_7$-$C_{30}$ hydrocarbons and a 1D system to analyze $C_1$-$C_{10}$ hydrocarbons to determine carbon monoxide conversion and product distribution. Flush the reactor system with nitrogen flow and cool down the reactor and knock out vessel. Drain any wax from the knock out vessel by heating the knock out vessel in an oven at 100° C. to melt the wax. Calculate distribution of products independently, i.e. without normalization. Product distribution shown in Table 4.

Exs 2-5

Repeat Ex 1, with any changes indicated in Table 2. Product distribution is shown in Table 4.

Comparative Examples (Com Ex) A-C

Repeat Ex 1, with any changes indicated in Table 3. Product distribution is shown in Table 5.

TABLE 2

| Example | Catalyst | Temperature (° C.) | Pressure (bar) | Gas Hourly Space Velocity (h$^{-1}$) | Time on Stream (h) |
|---|---|---|---|---|---|
| Ex 1 | Sulfurized ZSM-5 catalyst-1 | 770 | 10 | 1000 | 95 |
| Ex 2 | Sulfurized ZSM-5 catalyst-1 | 220 | 10 | 1500 | 37 |
| Ex 3 | Sulfurized ZSM-5 catalyst-3 | 220 | 10 | 1500 | 67 |
| Ex 4 | Sulfurized ZSM-5 catalyst-3 | 220 | 10 | 1200 | 96 |
| Ex 5 | Sulfurized ZSM-5 catalyst-3 | 220 | 10 | 1500 | 39 |

TABLE 3

| Comparative Example | Catalyst | Temperature (° C.) | Pressure (bar) | Gas Hourly Space Velocity (h$^{-1}$) | Time on Stream (h) |
|---|---|---|---|---|---|
| Com Ex A | Mordenite catalyst-A | 220 | 10 | 900 | 92 |
| Com Ex B | Mordenite catalyst-A | 220 | 10 | 1500 | 40 |
| Com Ex C | ZSM-5 catalyst B | 220 | 10 | 1500 | 67 |

Calculate carbon monoxide (CO) conversion by the following formula:

$$\text{CO conversion} = \left(1 - \frac{n_{CO,in} - n_{CO,out}}{n_{CO,in}}\right) \times 100\%$$

where nco$_{in}$ and nco$_{out}$ are moles of CO fed to the reactor and exiting the reactor respectively.

Calculate $C_5$-$C_{12}$ hydrocarbon % by the following formula:

$$C_5 - C_{12} \text{hydrocarbon}\% = \frac{\sum_{i=5}^{12} S_{n-C_i}}{\sum_{i=5}^{12} S_{C_i}} \times 100\%$$

where $S_{n-Ci}$ is the selectivity of hydrocarbons having a carbon number i, where, i is from 5 to 12, and $S_{Ci}$ is the selectivity of alkanes or olefins having a carbon number i, where, i is from 5 to 12.

Calculate $C_{13}$-$C_{20}$ hydrocarbon % by the following formula:

$$C_{13} - C_{20} \text{hydrocarbon}\% = \frac{\sum_{i=13}^{20} S_{n-C_i}}{\sum_{i=13}^{20} S_{C_i}} \times 100\%$$

where $S_{n-Ci}$ is the selectivity of hydrocarbons having a carbon number i, where, i is from 13 to 20, and $S_{Ci}$ is the selectivity of alkanes or olefins having a carbon number i, where, i is from 13 to 20.

Calculate product selectivities independently, meaning apply no normalization. This is represented by the following formula:

$$S_{Ci}\% = \frac{i \times n_{Ci}}{n_{CO,in} - n_{CO,out}} \times 100\%$$

where $S_{Ci}$ is selectivity to a hydrocarbon with carbon number i, $n_{Ci}$ is the amount of moles formed of this hydrocarbon, and $n_{CO,in}$ and $n_{CO,out}$ are the moles of CO fed to the reactor and exciting the reactor respectively.

TABLE 4

| Example | Carbon Monoxide Conversion (%) | $C_1$ (%) | $C_2$-$C_4$ (%) | $C_5$-$C_{12}$ (%) | $C_{13}$-$C_{20}$ (%) | $C_{21}$-$C_{30}$ (%) | Solid Wax (greater than $C_{30}$) |
| --- | --- | --- | --- | --- | --- | --- | --- |
| Ex 1 | 20 | 21 | 22 | 33 | 0 | 0 | None detected |
| Ex 2 | 21 | 19 | 21 | 42 | 0 | 1 | None detected |
| Ex 3 | 30 | 22 | 24 | 51 | 2 | 2 | None detected |
| Ex 4 | 25 | 21 | 23 | 48 | 0 | 2 | None detected |
| Ex 5 | 27 | 20 | 22 | 55 | 7 | 2 | None detected |

TABLE 5

| Comparative Example | Carbon Monoxide Conversion (%) | $C_1$ (%) | $C_2$-$C_4$ (%) | $C_5$-$C_{12}$ (%) | $C_{13}$-$C_{20}$ (%) | $C_{21}$-$C_{30}$ (%) | Solid Wax (greater than $C_{30}$) |
| --- | --- | --- | --- | --- | --- | --- | --- |
| Com Ex A | 18 | 19 | 10 | 34 | 16 | 4 | Some detected |
| Com Ex B | 11 | 19 | 11 | 39 | 17 | 4 | Some detected |
| Com Ex C | 35 | 18 | 13 | 49 | 14 | 3 | Some detected |

The data in Table 4 show that the processes disclosed herein form $C_5$-$C_{12}$ hydrocarbons. The data in Table 4 show that each of Examples 1-5 produces a liquid product stream that has a $C_{13}$ to $C_{20}$ hydrocarbon content of less than 5 wt %. In contrast to the data in Table 4, the data in Table 5 show that each of Comparative Examples A-C produces a liquid product stream that has a $C_{13}$ to $C_{20}$ hydrocarbon content equal to or greater than 14 wt %. Additionally, the data in Table 4 and Table 5 show that the product stream for each of Examples 1-5 has an advantageously reduced a $C_{21}$ to $C_{30}$ selectivity as compared respectively to each of Comparative Examples A-C. Further, the data in Table 4 and Table 5 show that the product stream for each of Examples 1-5 did not include detectable solid waxes. In contrast to Examples 1-5, each of Comparative Examples A-C produces a detectable amount of solid wax.

What is claimed:
1. A process for producing a liquid product stream that has a $C_{13}$ to $C_{20}$ hydrocarbon content of less than 5.0 wt % based upon a total weight of the liquid product stream, the process comprising:
contacting synthesis gas with a sulfurized Zeolite Socony Mobil-5 catalyst, wherein the sulfurized Zeolite Socony Mobil-5 catalyst includes cobalt and a sulfur doped Zeolite Socony Mobil-5 support, with the sulfur being incorporated via sulfate ions, the cobalt being present in an amount within a range of from 1 to 25 wt % based upon a dry weight of the sulfurized Zeolite Socony Mobil-5 catalyst, the sulfur being present in an amount within a range of from 0.01 to 1.00 wt %, based upon a dry weight of the sulfurized Zeolite Socony Mobil-5 catalyst, the conditions consisting essentially of a temperature within a range of from 150 to 300° C., a pressure within a range of from 5 to 40 bar, and a gas hourly space velocity within a range of from 100 to 10000 h$^{-1}$.

2. The process of claim 1, wherein the sulfurized Zeolite Socony Mobil-5 catalyst includes an alkali metal.

3. The process of claim 2, wherein the alkali metal is within a range of from 0.01 to 4.50 wt % based upon a dry weight of the sulfurized ZSM-5 catalyst.

4. The process of claim 2, wherein the alkali metal is sodium.

5. The process of claim 1, wherein the sulfurized Zeolite Socony Mobil-5 catalyst includes a reduction promoter.

6. The process of claim 5, wherein the reduction promoter is within a range of from 0.01 to 5.00% based upon a dry weight of the sulfurized ZSM-5 catalyst.

7. The process of claim 6, wherein the reduction promoter is ruthenium.

8. The process of claim 1, wherein the liquid product stream has a $C_5$-$C_{12}$ hydrocarbon content of at least 25 wt % based upon a total weight of the liquid product stream.

* * * * *